(12) United States Patent
Sainath et al.

(10) Patent No.: US 12,444,408 B2
(45) Date of Patent: *Oct. 14, 2025

(54) TWO-PASS END TO END SPEECH RECOGNITION

(71) Applicant: GOOGLE LLC, Mountain View, CA (US)

(72) Inventors: Tara N. Sainath, Jersey City, NJ (US); Ruoming Pang, New York, NY (US); David Rybach, Mountain View, CA (US); Yanzhang He, Palo Alto, CA (US); Rohit Prabhavalkar, Mountain View, CA (US); Wei Li, Fremont, CA (US); Mirkó Visontai, Mountain View, CA (US); Qiao Liang, Redwood City, CA (US); Trevor Strohman, Sunnyvale, CA (US); Yonghui Wu, Fremont, CA (US); Ian C. McGraw, Menlo Park, CA (US); Chung-Cheng Chiu, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 631 days.

This patent is subject to a terminal disclaimer.

(21) Appl. No.: 17/616,129

(22) PCT Filed: Jun. 3, 2020

(86) PCT No.: PCT/US2020/035912
§ 371 (c)(1),
(2) Date: Dec. 2, 2021

(87) PCT Pub. No.: WO2020/247489
PCT Pub. Date: Dec. 10, 2020

(65) Prior Publication Data
US 2022/0310072 A1    Sep. 29, 2022

Related U.S. Application Data

(60) Provisional application No. 62/943,703, filed on Dec. 4, 2019, provisional application No. 62/856,815, filed on Jun. 4, 2019.

(51) Int. Cl.
*G10L 15/16* (2006.01)
*G10L 15/05* (2013.01)
*G10L 15/32* (2013.01)

(52) U.S. Cl.
CPC ............. *G10L 15/16* (2013.01); *G10L 15/05* (2013.01); *G10L 15/32* (2013.01)

(58) Field of Classification Search
CPC ......... G10L 15/16; G10L 15/22; G10L 15/32; G10L 15/05; G10L 15/26; G10L 15/063;
(Continued)

(56) References Cited

U.S. PATENT DOCUMENTS 9,799,327 B1 * 10/2017 Chan .................... G10L 15/183
9,966,066 B1 *  5/2018 Corfield ............... G10L 15/142
(Continued)

FOREIGN PATENT DOCUMENTS

CN    109545190    3/2019
CN    114270434    4/2022
(Continued)

OTHER PUBLICATIONS

European Patent Office; International Search Report and Written Opinion of PCT Ser. No. PCT/US2020/035912; 12 pages; Sep. 18, 2020.
(Continued)

*Primary Examiner* — Abdelali Serrou
(74) *Attorney, Agent, or Firm* — Gray Ice Higdon

(57) ABSTRACT

Two-pass automatic speech recognition (ASR) models can be used to perform streaming on-device ASR to generate a
(Continued)

text representation of an utterance captured in audio data. Various implementations include a first-pass portion of the ASR model used to generate streaming candidate recognition(s) of an utterance captured in audio data. For example, the first-pass portion can include a recurrent neural network transformer (RNN-T) decoder. Various implementations include a second-pass portion of the ASR model used to revise the streaming candidate recognition(s) of the utterance and generate a text representation of the utterance. For example, the second-pass portion can include a listen attend spell (LAS) decoder. Various implementations include a shared encoder shared between the RNN-T decoder and the LAS decoder.

18 Claims, 10 Drawing Sheets

(58) Field of Classification Search
CPC ......... G10L 15/02; G10L 15/18; G10L 15/14;
G10L 15/183; G10L 15/10; G10L
2015/223; G10L 15/28; G10L 15/30;
G10L 2015/027; G10L 2015/221; G10L
2015/088; G10L 25/78; G10L 15/04;
G10L 2015/025; G10L 15/187; G10L
2015/0631; G10L 15/1822; G10L 15/197;
G10L 19/008; G10L 19/167; G10L
2015/228; G10L 25/30; G10L 15/07;
G10L 15/083; G10L 15/20; G10L 17/00;
G10L 17/24; G10L 19/06; G10L
2015/085; G10L 25/18; G10L 15/06;
G10L 15/08; G10L 15/142; G10L 17/04;
G10L 17/18; G10L 15/005; G10L 15/01;
G10L 15/1815; G10L 2015/0633; G10L
2015/086; G10L 25/93; G06F 3/167;
G06F 16/638; G06F 16/683; G06F 40/30;
G06F 16/3329; G06F 16/3332; G06F
16/3343; G06F 16/387; G06F 40/211
See application file for complete search history.

(56) References Cited

U.S. PATENT DOCUMENTS

| | | | |
|---|---|---|---|
| 10,043,512 B2* | 8/2018 | Jaitly | G10L 15/02 |
| 10,176,802 B1* | 1/2019 | Ladhak | G10L 15/16 |
| 10,281,885 B1* | 5/2019 | Chiu | G05B 13/027 |
| 10,319,374 B2* | 6/2019 | Catanzaro | G10L 15/14 |
| 10,402,495 B1 | 9/2019 | Rush | |
| 10,573,295 B2* | 2/2020 | Zhou | G10L 15/063 |
| 2004/0059575 A1 | 3/2004 | Brookes | |
| 2018/0144749 A1* | 5/2018 | Choi | G10L 15/08 |
| 2018/0247643 A1* | 8/2018 | Battenberg | G10L 15/22 |
| 2018/0330718 A1 | 11/2018 | Hori | |
| 2020/0219486 A1* | 7/2020 | Fu | G10L 15/02 |
| 2020/0265831 A1* | 8/2020 | Wang | G10L 15/16 |

FOREIGN PATENT DOCUMENTS

| | | |
|---|---|---|
| EP | 1548705 | 4/2009 |
| JP | H05204396 | 8/1993 |
| JP | 2017040919 | 2/2017 |
| WO | 2018071389 | 4/2018 |
| WO | 2018207390 | 11/2018 |

OTHER PUBLICATIONS

Williams, I. et al., "Contextual Speech Recognition in End-to-End Neural Network Systems Using Beam Search;" Proceedings of Interspeech 2018; 5 pages; Sep. 2, 2018.

Kannan, A. et al., "An Analysis of Incorporating an External Language Model into a Sequence-to-Sequence Model;" 2018 IEEE International Conference on Acoustics, Speech, and Signal Processing (ICASSP); 5 pages; Apr. 15, 2018.
He, Y. et al., "Streaming End-to-End Speech Recognition for Mobile Devices;" 2019 International Conference on Acoustics, Speech and Signal Processing (ICASSP); 5 pages; May 12, 2019.
Chiu, C. et al., "State-of-the-Art Speech Recognition with Sequence-to-Sequence Models," in Proceedings of IEEE International Conference on Acoustics, speech and Signal Processing (ICASSP); pp. 4774-4778, Apr. 2018.
Graves, A., "Sequence Transduction with Recurrent Neural Networks;" arXiv.org; arXiv:1211.3711v1; 9 pages; Nov. 14, 2012.
Rao, K. et al., "Exploring Architectures, Data and Units for Streaming End-to-End Speech Recognition with RNN-Transducer," in Proceedings of IEEE Automatic Speech Recognition and Understanding; 7 pages; Dec. 2017.
Chan, W. et al., "Listen, Attend and Spell," CoRR, arXiv.org, arXiv:/1508.01211v2; 16 pages, Aug. 20, 2015 Aug. 20.
Kim, S. et al., "Joint CTC-Attention Based End-to-End Speech Recognition Using Multi-Task Learning," in Proceedings of IEEE International Conference on Acoustics, speech and Signal Processing (ICASSP); pp. 4835-4839; Mar. 2017.
Chiu, C-C. et al., "Monotonic Chunkwise Alignments," in Proceedings of International Conference on Learning Representations (ICLR); 16 pages; 2017.
Sainath, T. et al., "Two-Pass End-to-End Speech Recognition;" Cornell University, arXiv.org; arXiv:1908.10992v1; 5 pages; Aug. 29, 2019.
Pundak G. et al., "Lower Frame Rate Neural Network Acoustic Models," in Proceedings of Interspeech; 5 pages; 2016.
Schuster, M. et al., "Japanese and Korean voice search," 2012 IEEE International Conference on Acoustics, Speech and Signal Processing (ICASSP); pp. 5149-5152; Mar. 2012.
Chang, S-Y. et al., "Joint Endpointing and Decoding with End-to-End Models;" IEEE International Conference on Acoustics, Speech and Signal Processing (ICASSP); pp. 5626-5630; May 12, 2019.
Vaswani, A. et al., "Attention Is All You Need," CoRR, arXiv.org, arXiv:1706.03762v5, Dec. 6, 2017.
Shen, J. et al., "Lingvo: A Modular and Scalable Framework for Sequence-to-Sequence Modeling"; CoRR, arXiv:1902.08295; 2019; 17 pages.
Kim C. et al., "Generation of Large-Scale Simulated Utterances in Virtual Rooms to Train Deep-Neural Networks for Far-Field Speech Recognition in Google Home;" in Proceedings of Interspeech; 5 pages; Aug. 2017.
Prabhavalkar, R. et al., "Minimum Word Error Rate Training for Attention-Based Sequence-to-Sequence Models," in Proceedings of IEEE International Conference on Acoustics, speech and Signal Processing (ICASSP); pp. 4839-4843, Apr. 2018.
Graves, A. et al., "Speech Recognition with Deep Recurrent Neural Networks," in Proceedings of IEEE International Conference on Acoustics, speech and Signal Processing (ICASSP); pp. 6645-6649; May 2013.
Li, B. et al., "Multi-Dialect Speech Recognition with a Single Sequence-to-Sequence Model," in Proceedings of IEEE International Conference on Acoustics, Speech, and Signal Processing (ICASSP); , pp. 4749-4753.
Shannon, M. et al., "Improved End-of-Query Detection for Streaming Speech Recognition," in Proceedings of Interspeech 2017; 5 pages.
Chang, S-Y. et al., "Endpoint Detection Using Grid Long Short-Term Memory Networks for Streaming Speech Recognition.," in Proceedings of Interspeech 2017; 5 pages.
Chang, S-Y. et al., "A Unified End-Pointer Using Multitask and Multidomain Training," in Proceedings of IEEE Automatic Speech Recognition and Understanding (ASRU); pp. 100-106; Dec. 2019.
Liao, H. et al., "Large Scale Deep Neural Network Acoustic Modeling with Semi-Supervised Training Data for YouTube Video Transcription," in Proceedings of IEEE Automatic Speech Recognition and Understanding (ASRU); pp. 368-373; Dec. 2013.

(56) References Cited

OTHER PUBLICATIONS

Soltau, H. et al., "Neural Speech Recognizer: Acoustic-to-Word LSTM Model for Large Vocabulary Speech Recognition," in Proceedings of Interspeech 2017; 5 pages; Aug. 2017.
Atkinson, K. et al., "VarCon Open Source Dictionary;" http://wordlist.aspell.net/ varcon-readme/; retrieved from internet Oct. 1, 2021; 14 pages; dated Dec. 7, 2020.
Peddinti, V. et al. "Far-Field ASR Without Parallel Data;" in Proceedings of Interspeech 2016; 5 pages; Sep. 2016.
Li, J. et al., "Improving Wideband Speech Recognition using Mixed-bandwidth Training Data in CD-DNN-HMM," in Proceedings of IEEE Spoken Language Technology (SLT); pp. 131-136; Dec. 2012.
Biadsy, F. et al., "Effectively Building Tera Scale MaxEnt Language Models Incorporating Non-Linguistic Signals, " in Proceedings of Interspeech 2017; 5 pages; Aug. 2017.
McGraw, I. et al., "Personalized Speech Recognition on Mobile Devices," in Proceedings of IEEE International Conference on Acoustics, speech and Signal Processing (ICASSP); pp. 5955-5959; Mar. 2016.
Aleksic, P. et al., "Bringing Contextual Information to Google Speech Recognition," in . In Proceedings of Interspeech 2015; 5 pages; 2015.
Ortmanns, S. et al., "A Word Graph Algorithm for Large Vocabulary Continuous Speech Recognition," Computer Speech and Language; vol. 11, No. 1; pp. 43-72; Jan. 1997.
Schwartz, R. et al., "A comparison of several approximate algorithms for finding multiple (N-best) sentence hypotheses," in Proceedings of IEEE International Conference on Acoustics, speech and Signal Processing (ICASSP); pp. 701-704; 1991.
Sundermeyer, M. et al., "From Feedforward to Recurrent LSTM Neural Networks for Language Models," IEEE Transactions on Audio, Speech, and Language Processing; vol. 23, No. 3; pp. 517-528, Feb. 2015.
Liu, X. et al., "Two Efficient Lattice Rescoring Methods Using Recurrent Neural Network Language Models;" IEEE Transactions on Audio, Speech, and Language Processing; vol. 24, No. 8; pp. 1438-1449, Aug. 2016.
Kumar, S. et al., "Lattice Rescoring Strategies for Long Short Term Memory Language Models in Speech Recognition," in Proceedings of IEEE Automatic Speech Recognition and Understanding; 8 pages; Dec. 2017.
Prabhavalkar, R. et al., "An Analysis of "Attention" In Sequence-to-Sequence Models," in Proceedings of Interspeech 2017; pp. 3702-3706; Aug. 2017.
Chorowski, J. et al., "Attention-Based Models for Speech Recognition," in Proceedings of the 28th International Conference on Neural Information Processing Systems, vol. 28; 9 pages; Dec. 2015.
Lowerre, B.T., "The Harpy Speech Recognition System," Ph.D. thesis, Department of Computer Science, Carnegie-Mellon University, Pittsburgh, PA; 125 pages; Apr. 1976.
Miller, R.B., "Response time in man-computer conversational transactions," in Proceedings 1968 Fall Joint Computer Conference, Part I, New York, NY, USA, AFIPS '68 (Fall, part I), pp. 267-277, ACM, Dec. 1968.
Chorowski, J.K. et al., "Towards Better Decoding and Language Model Integration in Sequence to Sequence Models," Interspeech 2017; 6 pages; 2017.
Gonzalvo, X. et al., "Recent Advances in Google Real-time HMM-driven Unit Selection Synthesizer," Interspeech 2016, 5 pages, Sep. 2016.

Pundak, G. et al., "Deep Context: End-to-End Contextual Speech Recognition," in Proceedings of IEEE Spoken Language Technology; pp. 418-425; Dec. 2018.
Graves A. et al., "Bidirectional LSTM Networks for Improved Phoneme Classification and Recognition;" Artificial Neural Networks: Formal Models and Their Applications—ICANN; pp. 799-804.
Schuster, M. et al., "Bidirectional Recurrent Neural Networks;" IEEE Transactions on Signal Processing, vol. 45, No. 41; pp. 2673-2681; Nov. 1997.
Japanese Patent Office; Notice of Reasons for Rejection issued in Application No. 2021-569526; 7 pages; dated Feb. 6, 2023.
Australian Government; Notice of Acceptance issued for Application No. 2020288565, 3 pages, dated Feb. 7, 2023.
European Patent Office; Intention to Grant issued in Application No. 20747231.7; 7 pages; dated Oct. 18, 2021.
Australian Government; Examination Report No. 1 for Application No. 2023202949, 3 pages, dated Nov. 30, 2023.
Chan, W. et al., Listen, Attend and Spell,: a neural network for large vocabulary conversational speech recognition; IEEE international conference on acoustics, speech and signal processing (ICASSP); pp. 4960-4964; dated 2016.
Wang, Z. et al.; R-transformer: Recurrent neural network enhanced transformer. arXiv preprint arXiv: 1907.05572; dated Jul. 12, 2019.
Intellectual Property India; First Examination Report issued in App. 202127060632; 6 pages; dated Jun. 10, 2022.
European Patent Office; Extended European Search Report issued in Application No. 22166641.5, 8 pages, dated Jul. 27, 2022.
Zhou, Shiyu et al.; "A Comparison of Modeling Units in Sequence-to-Sequence Speech Recognition with the Transformer on Mandarin Chinese," Advances in Databases and Information Systems, Springer International Publishing, XP047496514, dated Nov. 17, 2018.
Sung, Tzu-Wei et al.; "Towards End-to-end Speech-to-text Translation with Two-pass Decoding," 2019 ICASSP, pp. 7175-7179, XP033565334, dated May 12, 2019.
Abadi et al., "Tensorflow: Large-scale Machine Learning on Heterogeneous Systems;" Software from tensorflow.org; 19 pages; Nov. 9, 2015.
Polyak, B et al., "Acceleration of Stochastic Approximation by Averaging;" SIAM Journal on Control and Optimization, vol. 30, No. 4, pp. 838-855; Jul. 1992.
Narayanan, A. et al., "Recognizing Long-Form Speech Using Streaming End-to-End Models," in IEEE Automatic Speech Recognition and Understanding Workshop (ASRU); pp. 920-927; 2019.
Australian Government; Examination report No. 1 for Application No. 2020288565, 2 pages, dated Sep. 20, 2022.
Australian Government; Notice of Acceptance issued for Application No. 2023202949, 3 pages, dated May 7, 2024.
European Patent Office, Intention to Grant issued in Application No. 22166641.5, 52 pages, dated Sep. 11, 2024.
Intellectual Property India; Hearing Notice issued in 202127060632; 2 pages, dated Oct. 10, 2024.
China National Intellectual Property Administration; Notification of First Office Action issued in Application No. 202080040823.0; 21 pages; dated Sep. 11, 2024.
The Korean Intellectual Property Office; Notice of Office Action issued in Application No. 10-2021-7037998; 9 pages; dated Aug. 29, 2024.
China National Intellectual Property Administration; Notification of Second Office Action issued in Application No. 202080040823.0; 22 pages; dated Jul. 22, 2025.

* cited by examiner

TWO-PASS END TO END SPEECH RECOGNITION

BACKGROUND

An automated assistant (also known as a "personal assistant", "mobile assistant", etc.) may be interacted with by a user via a variety of client devices such as smart phones, tablet computers, wearable devices, automobile systems, standalone personal assistant devices, and so forth. An automated assistant receives input from the user including spoken natural language input (i.e., utterances) and may respond by performing an action, by controlling another device and/or providing responsive content (e.g., visual and/or audible natural language output). An automated assistant interacted with via a client device may be implemented via the client device itself and/or via one or more remote computing devices that are in network communication with the client device (e.g., computing device(s) in the cloud).

An automated assistant can convert audio data, corresponding to a spoken utterance of a user, into corresponding text (or other semantic representation). For example, audio data can be generated based on the detection of a spoken utterance of a user via one or more microphones of a client device that includes the automated assistant. The automated assistant can include a speech recognition engine that attempts to recognize various characteristics of the spoken utterance captured in the audio data, such as the sounds produced (e.g., phonemes) by the spoken utterance, the order of the pronounced sounds, rhythm of speech, intonation, etc. Further, the speech recognition engine can identify text words or phrases represented by such characteristics. The text can then be further processed by the automated assistant (e.g., using a natural language understanding engine and/or a dialog state engine) in determining responsive content for the spoken utterance. The speech recognition engine can be implemented by the client device and/or by one or more automated assistant component(s) that are remote from, but in network communication with, the client device.

SUMMARY

Techniques described herein are directed towards generating a text representation of a spoken utterance using an end-to-end (E2E) two-pass automatic speech recognition (ASR) model. The two-pass ASR model includes a streaming first-pass portion along with a non-streaming second-pass portion. In many implementations, the first-pass portion includes a recurrent neural network-transformer (RNN-T) decoder, and can generate, in a streaming manner, candidate text representation(s) of the spoken utterance. In a variety of implementations, a non-streaming second-pass portion (e.g., one including a listen attend spell (LAS) decoder) can be used to improve the initial candidate text representation(s) generated in the first-pass portion. For example, the LAS decoder can be used to rerank candidate text representations generated using the RNN-T decoder. In many implementations, the two-pass ASR model can include a shared encoder, where the RNN-T decoder and the LAS decoder share the shared encoder. Use of a shared encoder can reduce model size of the two-pass ASR model and/or can provide increased computational efficiency as compared to, for example, using a dedicated encoder for the RNN-T decoder and using a dedicated encoder for the LAS decoder. Put another way, use of the shared encoder can enable efficient utilization of memory and/or computational resources when the two-pass ASR model is utilized in generating a text representation of a spoken utterance. This conservation of memory and/or computational resources can be especially impactful when the two-pass ASR model is stored and utilized by a client device, which often has limited memory and/or computational resources. For example, use of the shared encoder can enable on-device ASR to be performed on client device(s) whose limited resources can prevent (at least in some situations, such as low-battery situations) on-device ASR using other model(s).

As an example, a client device can capture a spoken utterance of "turn on the living room lights" using one or more microphones of the client device. The spoken utterance of "turn on the living room lights" can be processed, in a streaming manner, using the shared encoder to generate shared encoder output, and the shared encoder output can be processed using the RNN-T decoder to generate streaming first-pass candidate text representation(s) of "turn on the living room lights". In response to determining the user has finished speaking, the first-pass candidate text representation(s) along with the shared encoder output can be processed using the LAS decoder to generate the text representation of "turn on the living room lights".

In some implementations, the two-pass model can be trained using a combined loss function which includes both a RNN-T loss and a LAS loss. In some of those implementations, the training process can include: (1) training an encoder and RNN-T decoder; (2) freezing the encoder trained in (1) and using the frozen encoder in training a LAS decoder; and (3) training the shared encoder, the RNN-T decoder, and the LAS decoder at the same time using a combined loss function. In some versions of those implementations, the LAS decoder can additionally be trained using a minimum word error rate (MWER) training process.

Accordingly, various implementations set for techniques for using a two-pass ASR model in on-device streaming ASR. Conventional ASR systems, for example, can require capturing audio data at a client device, transmitting the audio data and/or a representation of the audio data to a remote server, processing the audio data and/or the representation of the audio data at the remote server to generate a text representation of an utterance captured in the audio data, and transmitting the text representation of the utterance back to the client device. In contrast, on-device ASR systems generate a text representation of an utterance locally at the client device without the need to transmit data to or from a remote server. In many implementations, use of on-device ASR including two-pass ASR models can conserve computational resources (e.g., battery power, processor cycles, memory, etc.) when compared to convention ASR by removing the need to transmit data to and receive data from a remote server. Additionally, on-device ASR can provide user privacy advantages by processing audio data to generate a text representation locally without transmitting the audio data to the remove server. Furthermore, on-device ASR systems provide increased reliability over conventional ASR models. For example, an on-device ASR system can generate a text representation of audio data when a network connection to transmit the audio data to the remote server is unavailable, such as when a wireless network goes down. In contrast, conventional ASR systems are unable to generate a text representation of audio data when a network connection to transmit data to and from the remote server are unbailable.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
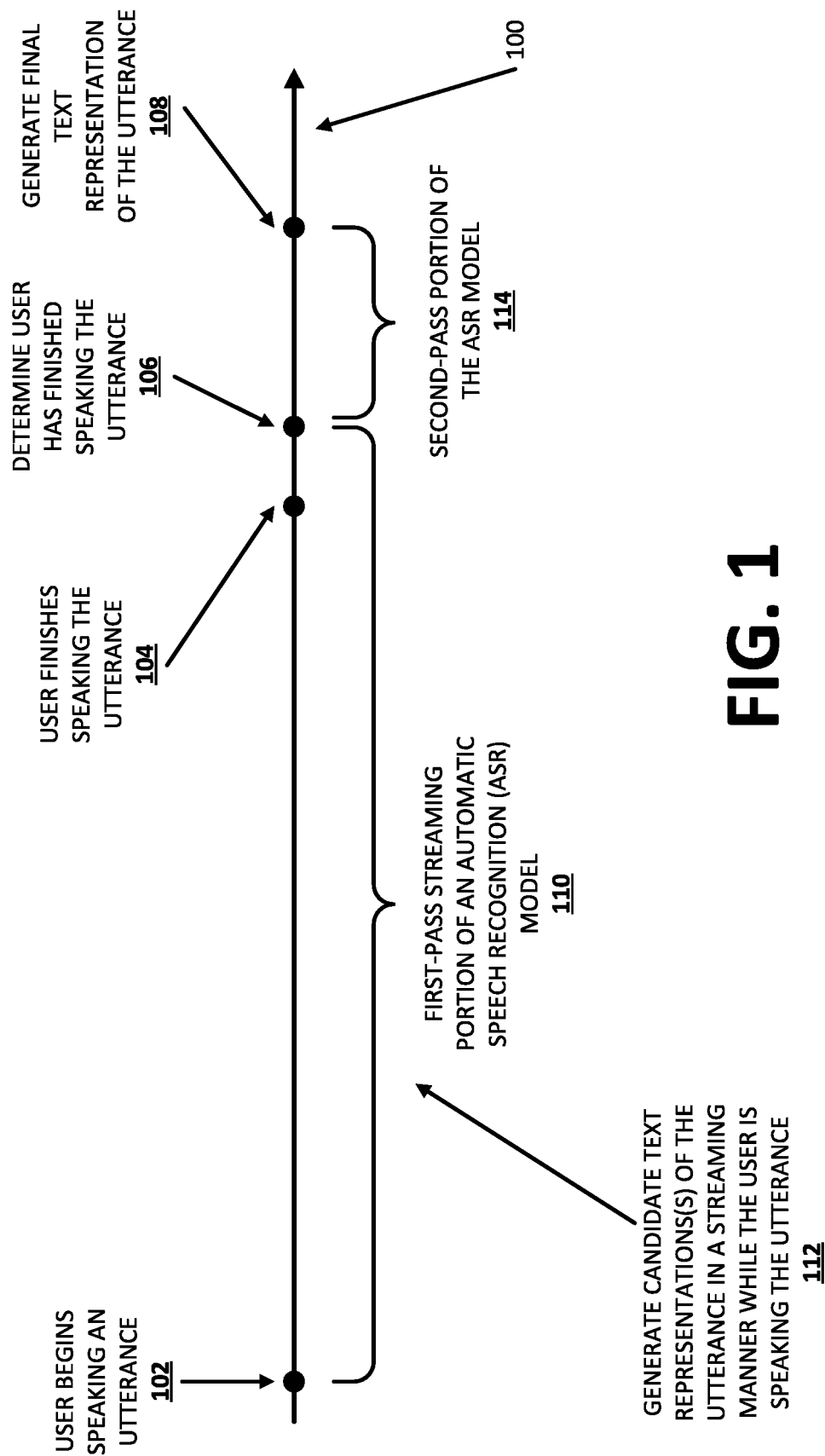
FIG. 1 illustrates an example of generating a text representation of an utterance in accordance with various implementations disclosed herein.

The requirements for many applications of state-of-the-art speech recognition systems can include not only low word error rate (WER) but also low latency. Specifically, for many use-cases, the system must be able to decode utterances in a streaming fashion and faster than real-time. Recently, a streaming recurrent neural network transducer (RNN-T) end-to-end (E2E) model has shown to be a good candidate for on-device speech recognition, with improved WER and latency metrics compared to conventional on-device models. However, this model can still lag behind a large state-of-the-art conventional model in quality. On the other hand, a non-streaming E2E Listen, Attend and Spell (LAS) model has shown comparable quality to large conventional models. Techniques described herein bring the quality of an E2E streaming model closer to that of a conventional system by incorporating a LAS network as a second-pass component, while still abiding by latency constraints.

E2E models for speech recognition, fold the acoustic model (AM), pronunciation model (PM) and language models (LMs) into a single network, and have shown competitive results compared to conventional ASR systems which have separate AM, PM, and LMs. E2E models are particularly attractive for on-device ASR, as they can outperform on-device conventional models of comparable size.

In many implementations, running ASR on-device, with direct user interaction, presents numerous challenges. First, the recognition results must be streaming. That is, words should appear on the screen as soon as they are spoken. Second, the model must have a small latency (i.e., the delay between the user speaking and the text appearing), thus running at or faster than real-time on mobile devices. Third, the model must be able to utilize user context (e.g., list of contacts, song names, etc.) to improve recognition accuracy. A RNN-T E2E model can satisfy these constraints.

Non-streaming E2E models, such as Listen, Attend and Spell (LAS), have shown competitive performance to a large conventional model. However, LAS models are not streaming as they must attend to the entire audio segment, making it challenging to use them in interactive applications.

In two-pass decoding, the second-pass model is often used to improve the initial outputs from first-pass models by using lattice rescoring or n-best reranking. Keeping user-perceived latency low while obtaining the quality gains is the main challenge with applying second-pass models. Language model rescoring is commonly been used for multi-pass decoding, but more recently has been used with a LAS model to rescore hypotheses from a first-pass conventional model. The LAS decoder, which takes acoustic information from the encoder and language model information from previous predictions, can be thought of as being strictly stronger than second-pass language models. Thus, techniques described herein explore using the LAS model for second-pass processing.

Specifically, a two-pass architecture in which an RNN-T decoder and a LAS decoder share an encoder network is explored. Sharing the encoder allows reduced model size and computation cost compared with having a dedicated encoder for the RNN-T decoder and a distinct dedicated encoder for the LAS decoder. During inference, the RNN-T decoder produces streaming predictions while the LAS decoder finalizes the prediction. A variety of implementations explore tradeoffs by running the LAS decoder as a beam search versus rescoring hypotheses generated by the RNN-T decoder. In some implementations, computation cost can be reduced by running the first-pass RNN-T model with an adaptive beam and pruning the first-pass lattice before rescoring.

Figure 2:
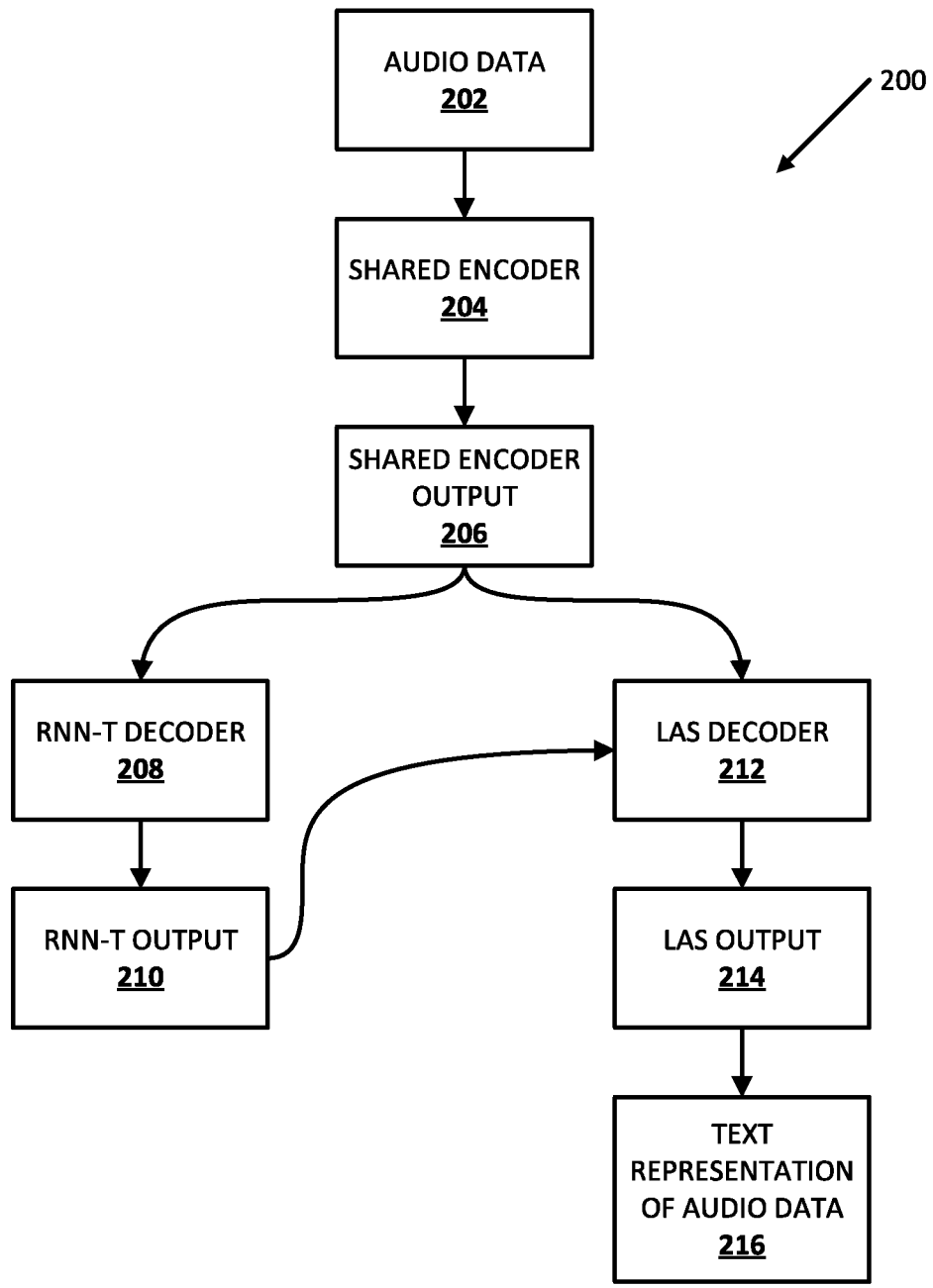
FIG. 2 illustrates an example of generating a text representation of an utterance using a two-pass ASR model in accordance with various implementations disclosed herein.

In some implementations, the two-pass ASR architecture is as illustrated in FIG. 2. The parameterized input acoustic frames can be denoted as $x=(x_1 \ldots x_T)$, where $x_t \in \mathbb{R}^d$ are log-mel filterbank energies. In some implementations, where (d=80), T denotes the number of frames in x. In the first-pass, each acoustic frame $x_t$ is passed through a shared encoder, including a multi-layer LSTM, to get output $e_t$, which is passed to an RNN-T decoder for producing $y_r$ at each time step in a streaming fashion. In the second-pass, the output of the shared encoder of all frames $e=(e_1 \ldots e_T)$ is passed to a LAS decoder. During training, the LAS decoder computes output $y_l$ according to e. During decoding the LAS decoder may additionally use $y_r$ as described below.

Using the LAS decoder in two different decoding modes is explored in this work. Specifically, in a "2nd beam search" mode, the LAS decoder can produce output $y_l$ from e alone, ignoring $y_r$, the output of the RNN-T decoder. Additionally or alternatively, when the LAS decoder is in the "rescoring" mode, the top-K hypotheses from the RNN-T decoder can be selected. The LAS decoder can process each sequence in a teacher-forcing mode, with attention one, to compute a score, which combines log probability of the sequence and the attention coverage penalty. The sequence with the highest LAS score is picked as the output sequence.

In some implementations, a two-pass model can be trained from random initialization with the following combined loss, where y* represents the ground truth transcript:

$$L_{combined(x,y^*)} = \lambda L_{RNNT}(x,y^*) + (1-\lambda)L_{LAS}(x,y^*) \quad (1)$$

In the above equation, $\lambda$ is a hyperparameter. In many implementations, $\lambda$ can be set to 0.5 to equally weight the RNN-T and LAS losses. In practice training the two-pass model directly from scratch can be unstable, mainly because the losses for RNN-T and LAS are in drastically different ranges when training from scratch. Therefore, a multi-step process to train the model: (1) train an encoder and a RNN-T model; (2) using the encoder trained in (1), train a LAS decoder, where the trained encoder is frozen while training the LAS decoder; and (3) "Deep finetuning": train the shared encoder and both decoders at the same time with the combined loss.

One of the drawbacks of the loss in Equation 1 is that the second-pass LAS decoder is optimized independently of the RNN-T decoder. This means that there can be a mismatch between the training and decoding strategies. To address this, an additional training step can be used to further refine the LAS decoder to minimize errors, using a mean word error rate (MWER) training process. Specifically, given input x, ground truth transcript y*, the probability computed by LAS $P(y_m|x)$ for any given target sequence $y_m$ with teacher-forcing (where m=r if $y_m$, is given by RNN-T and m=l if $y_m$ is given by LAS), the pre-trained two-pass model can be refined as follows.

First, the system runs a beam search with one of the decoders m from the two-pass model to get a set of hypotheses $H_m = \{h_1, \ldots, h_b\}$ where b is the beam-size. To make the MWER training match decoding, the generation of $H_m$ depends on the target decoding mode. For a LAS decoder to be used in the "2nd beam search" mode, the system computes $H_m$ by running beam search with the LAS decoder itself on x(m=l). For a LAS decoder to be used in the "rescoring" mode, on the other hand, the system computes $H_m(x)$ by running beam search with the first-pass RNN-T decoder (m=r).

For each sequence $y_m \in H_m$, let $W(y^*, y_m)$ be the number of word errors of $y_m$, let $$\bar{W}(y^*, H_m) = \frac{1}{|H_m|} \sum_{y_m \in H_m} W(y^*, y_m)$$

be the mean number of word errors for $H_m$, and let $\hat{W}(y^*, y_m) = W(y^*, y_m) - \bar{W}(y^*, H_m)$ be the relative word error rate of $y_m$ in $H_m$. Also let $$\hat{P}(y_m | x, H_m) = \frac{P(y_m | x)}{\sum_{y_i \in H_m} P(y_i | x)}$$

represent the conditional probability LAS decoder assigns to hypothesis $y_m$ among all hypotheses in $H_m$. The MWER loss is defined as:

$$L_{MWER}(x,y^*) = \sum_{y_m \in H_m(x)} \hat{P}(y_m|x,H_m)\hat{W}(y^*,y_m) \quad (2)$$

The LAS decoder can be trained to minimize a combination of the MWER loss and the maximum-likelihood cross-entropy loss:

$$L_{MWER}(x,y^*) + \lambda_{MLE} \log P(y^*|x) \quad (3)$$

where $\lambda_{MLE}$ is a hyperparameter. In many implementations, $\lambda_{MLE}$ can be set to equal 0.01.

Turning now to the figures, FIG. 1 illustrates an example of a two-pass ASR process in accordance with many implementations. FIG. 1 includes a horizontal axis 100 representing time, and includes points of time 102, 104, 106, and 108. A first point of time 102 indicates where a user begins speaking an utterance, and is followed by a second point of time 104 which indicates the user has finished speaking the utterance. Point of time 106 provides an indication of when the two-pass ASR system determines the user has finished speaking the utterance, and this follows time 104. In the illustrated example, the duration between time 104 and time 106 (i.e., the time it takes the system to determine the user has finished speaking) is much shorter than the duration between time 102 and 104 (i.e., the amount of time the user is speaking the utterance). Additionally or alternatively, point of time 108 indicates when the system generates a text representation of the utterance, where time 108 follows time 106.

In some implementations, the first-pass streaming portion of the ASR model 110 is the duration between time 102 and time 106 (i.e., the time from when the user begins speaking the utterance and the system determines the user has finished speaking the utterance). In the illustrated example, the first-pass streaming portion of the ASR model 110 begins when the user begins speaking. However, this is merely illustrative and the first-pass streaming portion 110 can begin slightly after the user begins speaking (e.g., the first-pass portion 110 can begin 0.01 seconds, 0.05 seconds, 0.1 seconds, 0.5 seconds, 1 second, and/or additional durations after the user begins speaking). Similarly, in the illustrated example, the first-pass streaming portion 110 ends when the system determines the user has finished speaking the utterance 106. However, this is merely illustrative and the first-pass streaming portion 110 can end slightly after the system determines the user has finished speaking the utterance 106 (e.g., the first-pass portion 110 can end 0.01 seconds, 0.05 seconds, 0.1 seconds, 0.5 seconds, 1 second, and/or additional durations after the system determines the user has finished speaking). In many implementations, the ASR system generates one or more candidate streaming text representation(s) of the utterance in a streaming manner while the user is speaking the utterance. In some implementations, the first-pass streaming portion of the ASR model 110 includes a shared encoder and a RNN-T decoder. Additionally or alternatively, the first-pass streaming portion of the ASR model 110 can include an additional encoder in addition to the shared encoder and the RNN-T decoder.

In some implementations, the second-pass portion of the ASR model 114 is the duration between time 106 and time 108 (i.e., the time from when the system has determined the user has finished speaking the utterance and when the system generates the final text representation of the utterance). In the illustrated example, the second-pass portion 114 begins when the system determines the user has finished speaking the utterance 106. However, this is merely illustrative and the second-pass streaming portion 114 can begin slightly after the system determines the user has finished speaking (e.g., the second-pass portion 114 can begin 0.01 seconds, 0.05 seconds, 0.1 seconds, 0.5 seconds, 1 second, and/or additional durations after the system determines the user has finished speaking). In some implementations, the second-pass portion 114 includes a LAS decoder, where the LAS decoder can refine the candidate text representation(s) generated in a streaming manner during the first-pass by processing output generated in the first-pass portion such as output generated using the shared encoder and/or output generated using the additional encoder.

FIG. 2 is a block diagram illustrating an example process 200 of generating a text representation of audio data using a two-pass ASR model. Audio data 202, capturing an utterance spoken by a human, is processed using shared encoder 204 to generate shared encoder output 206. In many implementations, audio data 202 is captures using one or more microphones of a client device. A first-pass portion of the ASR model can include processing audio data 202 using a shared encoder 204 to generate shared encoder output 206, as well as processing the shared encoder output 206 using a RNN-T decoder 208 to generate RNN-T output 210. In some implementations, the first-pass portion is streaming ASR, and RNN-T output 210 can include one or more candidate text representation(s) of the utterance captured in audio data 202 generated in a streaming manner.

In many implementations, the second-pass portion is non-streaming and can include processing the shared encoder output 206 along with RNN-T output 210 using LAS decoder 212 to generate LAS output 214. LAS output 214 can be used to generate the final text representation 216 of audio data 202. In many implementations, LAS decoder 212 can be used to refine the candidate text representation(s) of the audio data (i.e., LAS decoder 212 can refine RNN-T output 210) to generate the text representation of the audio data 216.

Figure 3:
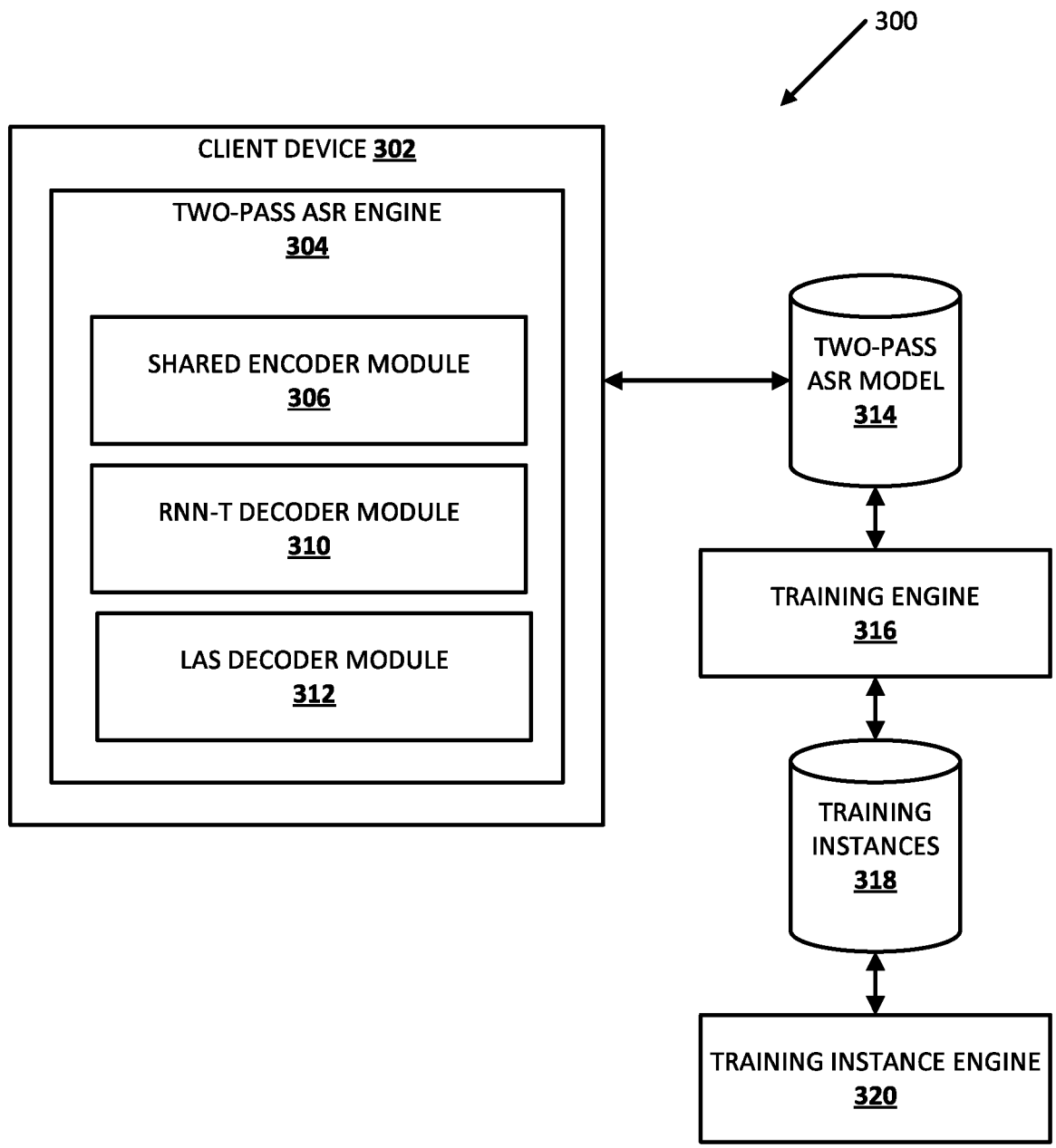
FIG. 3 illustrates a block diagram of an example environment in which implementations disclosed herein may be implemented.

FIG. 3 illustrates an example environment 300 in which implementations disclosed herein can be implemented. FIG. 3 includes a client device 302. In many implementations, client device 302 can execute an instance of an automated assistant (not depicted). The client computing device 302 may be, for example: a desktop computing device, a laptop computing device, a tablet computing device, a mobile phone computing device, a computing device of a vehicle of the user (e.g., an in-vehicle communications system, and in-vehicle entertainment system, an in-vehicle navigation system), a standalone interactive speaker, a smart appliance such as a smart television, and/or a wearable apparatus of a user that includes a computing device (e.g., a watch of the user having a computing device, glasses of the user having a computing device, a virtual or augmented reality computing device). Additional and/or alternative client computing devices may be provided.

Example environment 300 includes two-pass ASR engine 304, shared encoder module 306, RNN-T decoder module 310, LAS decoder module 312, training engine 316, training instance engine 318, two-pass ASR model 314, training instances 320 and/or additional or alternative engine(s) and/or model(s) (not depicted). Two-pass ASR engine 304, shared encoder module 306, RNN-T decoder module 310, and LAS decoder module 312 are example components in which techniques described herein may interface. In some implementations, one or more aspects of one or more engines and/or modules 304, 306, 310, 312, and 316 of FIG. 3 may be combined. For example, aspects of shared encoder module 306 may be combined with aspects of LAS decoder module 312.

Training instance engine 320 can generate training instances 318. For example, training instance engine 320 can generate one or more training instances, where each training instance includes audio data capturing an utterance and a ground truth text representation of the utterance. In some implementations, training instances 318 can be generated by training instance 320 in accordance with process 400 of FIG. 4 described herein.

Training engine 316 can train two-pass ASR model 314 using training instances 318. In some implementations, two-pass ASR model 314 can include a shared encoder portion, a RNN-T decoder portion, and a LAS decoder portion (e.g., the two-pass ASR model can be in accordance with the model illustrated in FIG. 2 as described herein). For example, training engine 316 can train the two-pass ASR model 314 by: (1) training the shared encoder and the RNN-T decoder portions in accordance with process 500 of FIG. 5, (2) training the LAS decoder portion using the shared encoder trained in step (1), where the shared encoder is frozen during training of the LAS decoder in accordance with process 600 of FIG. 6, and (3) refining the trained shared encoder, RNN-T decoder, and LAS decoder using a common loss in accordance with process 700 of FIG. 7.

Figure 8:
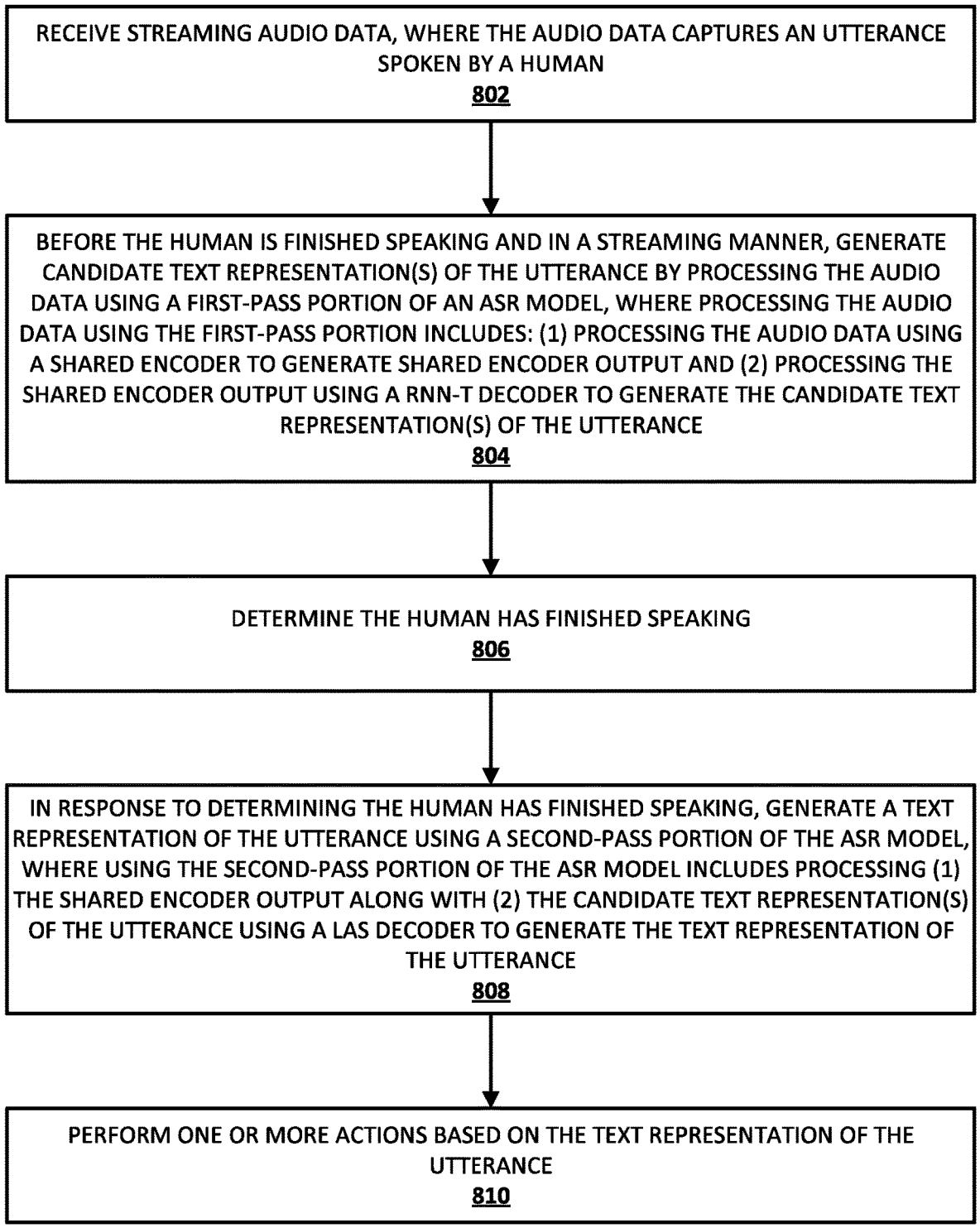
FIG. 8 is a flowchart illustrating an example process of generating a text representation of an utterance using a two-pass ASR model in accordance with implementations disclosed herein.

Generating a text representation of an utterance is described herein with respect to process 800 of FIG. 8. Two-pass ASR engine 304 can generate a text representation of captured audio data using two-pass ASR model 314. In some implementations, shared encoder module 306 of two-pass ASR engine 304 can process captured audio data using the shared encoder portion of two-pass ASR model 314 to generate shared encoder output in a streaming manner. RNN-T decoder module 310 can process shared encoder output using the RNN-T decoder portion of the two-pass ASR model 314 to generate one or more candidate text representations of the utterance. In some implementations, RNN-T decoder module 310 can process shared encoder output generated in a streaming manner by shared encoder module 306. LAS decoder module 312 can generate the text representation of the utterance by processing candidate text representation(s) of the utterance generated using RNN-T decoder module along with either shared encoder output stored in a buffer using shared encoder module 306.

Figure 4:
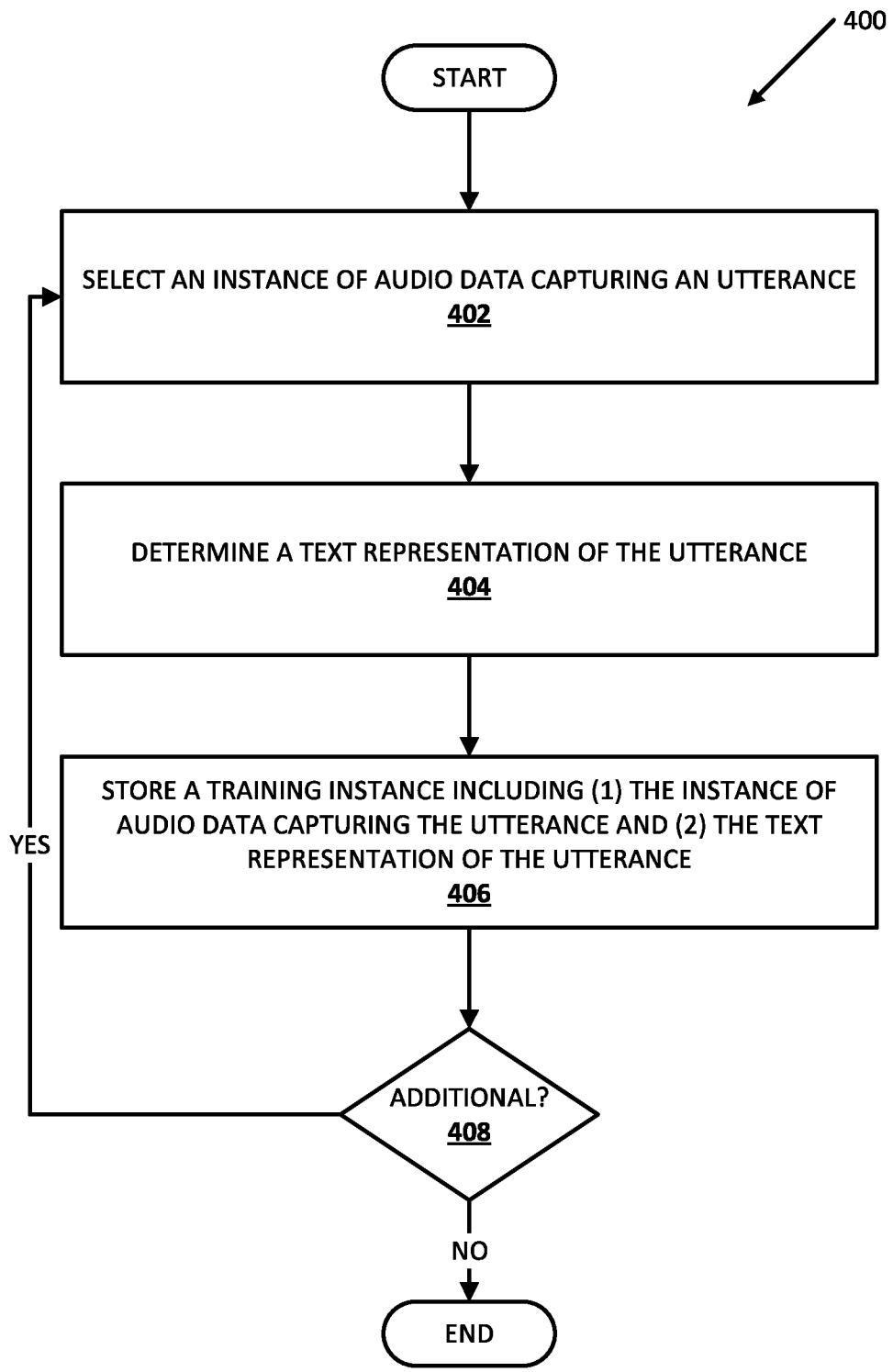
FIG. 4 is a flowchart illustrating an example process of generating a training instance, for training a two-pass ASR model, in accordance with various implementations disclosed herein.

FIG. 4 is a flowchart illustrating a process 400 of generating one or more training instances which can be used to train a two-pass ASR model in accordance with various implementations. For convenience, the operations of the flowchart are described with reference to a system that performs the operations. This system may include one or more components, such as one or more processors (e.g., CPU(s), GPU(s), and/or TPU(s)). While operations of process 400 are shown in a particular order, this is not meant to be limiting. One or more operations may be reordered, omitted, and/or added.

At block 402, the system selects an instance of audio data capturing an utterance. For example, the instance of audio data can capture a human speaking the utterance "Turn the thermostat up three degrees".

At block 404, the system determines a text representation of the utterance. In many implementations, the text representation of the utterance can be determined by a human reviewer of the selected instance of audio data. Additionally or alternatively, the text representation of the utterance can be determined using an additional ASR system. In many implementations, the text representation of the audio data can be determined using an additional ASR system where the generated text representation is reviewed for accuracy by a human reviewer.

At block 406, the system stores a training instance including (1) the instance of audio data capturing the utterance and (2) the text representation of the utterance.

At block 408, the system determines whether to generate any additional training instances. If so, the system proceeds back to block 402, selects an additional instance of audio data capturing an utterance, before proceeding to blocks 404 and 406 using the additional instance of audio data. In many implementations, the system can determine whether to generate additional training instance(s) based on whether one or more conditions are satisfied, such as whether a threshold number of training instances have been generated, whether there are any remaining unprocessed instances of audio data, and/or whether additional condition(s) are satisfied. If, at block 408, the system determines to not generate any additional training instances, the process ends.

Figure 5:
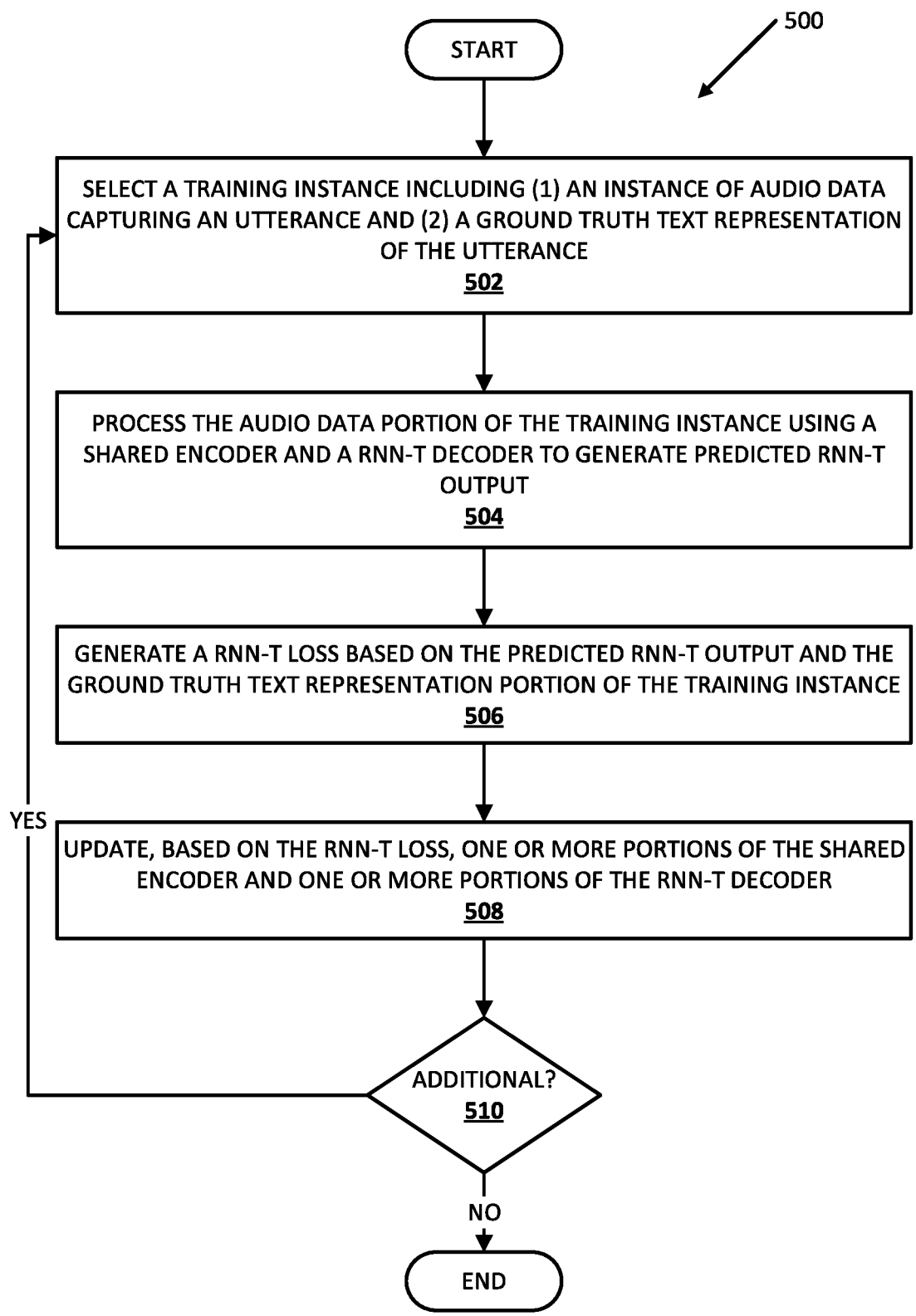
FIG. 5 is a flowchart illustrating an example process of training a first-pass portion of a two-pass ASR model in accordance with implementations disclosed herein.

FIG. 5 is a flowchart illustrating a process 500 of training a shared encoder and a RNN-T decoder of a two-pass ASR model in accordance with various implementations. For convenience, the operations of the flowchart are described with reference to a system that performs the operations. This system may include one or more components, such as one or more processors (e.g., CPU(s), GPU(s), and/or TPU(s)). While operations of process 500 are shown in a particular order, this is not meant to be limiting. One or more operations may be reordered, omitted, and/or added.

At block 502, the system selects a training instance including (1) an instance of audio data capturing an utterance and (2) a ground truth representation of the utterance. In some implementations, the training instance can be generated in accordance with process 400 of FIG. 4.

At block 504, the system processes the audio data portion of the training instance using the shared encoder to generate shared encoder output, and can process the shared encoder output using the RNN-T decoder to generated predicted RNN-T output.

At block 506, the system generates a RNN-T loss based on the predicted RNN-T output and the ground truth text representation portion of the training instance.

At block 508, the system updates, based on the RNN-T loss, one or more portions of the shared encoder and/or one or more portions of the RNN-T decoder.

At block 510, the system determines whether to perform additional training. If so, the system proceeds back to block 502, the selects an additional training instance before proceeding to blocks 504, 506, and 508 using the additional training instance, before performing an additional iteration of block 510. In some implementations, the system can determine to perform more training if there are one or more additional unprocessed training instances and/or if other criterion/criteria are not yet satisfied. The other criterion/criteria can include, for example, whether a threshold number of epochs have occurred and/or a threshold duration of training has occurred. Although process 500 is described with respect to a non-batch learning technique, batch learning may additionally and/or alternatively be utilized. If, at block 510, the system determines to not perform additional training, the process ends.

Figure 6:
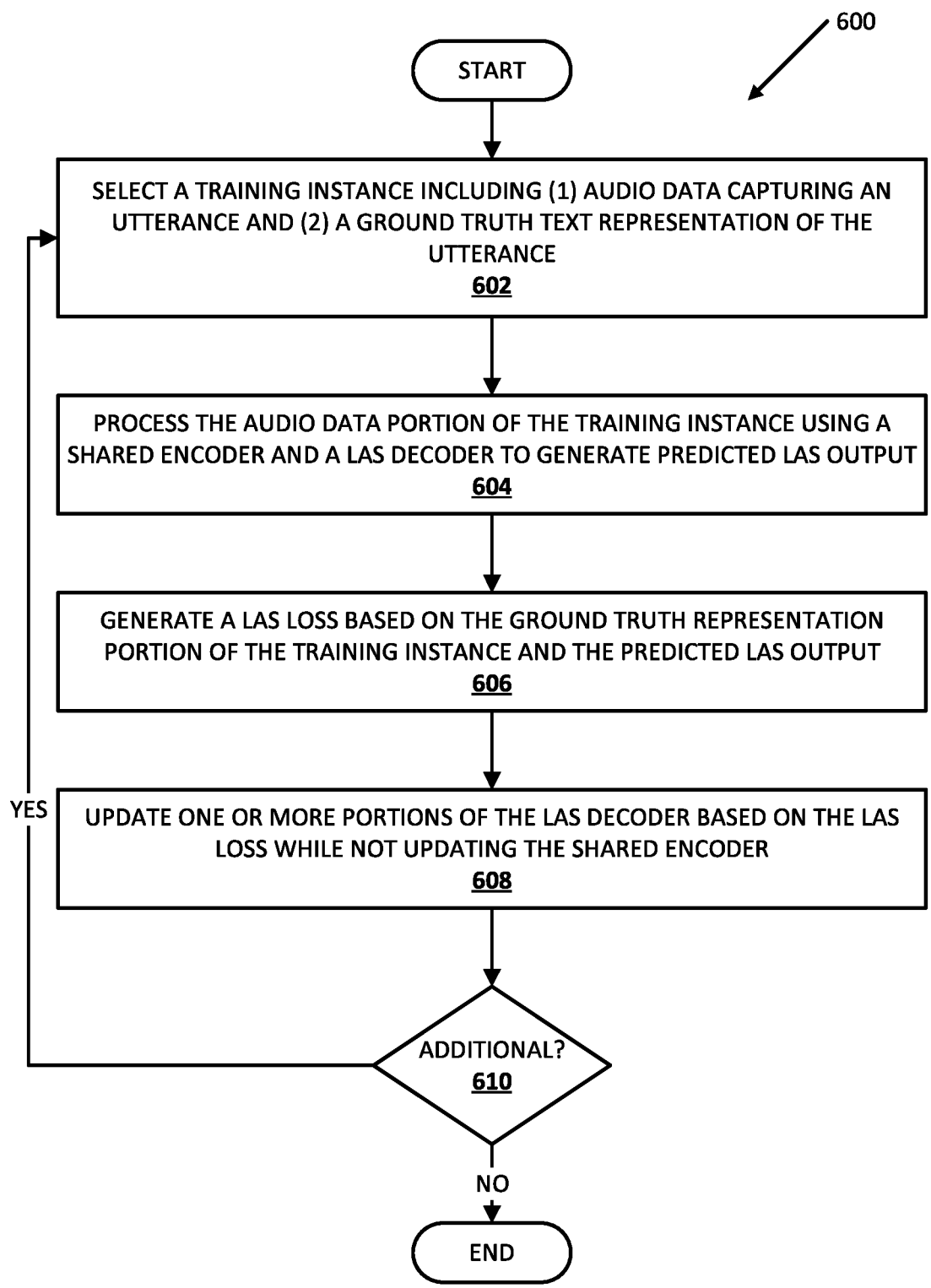
FIG. 6 is a flowchart illustrating an example process of training a second-pass portion of a two-pass ASR model in accordance with implementations disclosed herein.

FIG. 6 is a flowchart illustrating an example process 600 of training a LAS decoder of a two-pass ASR model in accordance with various implementations. For convenience, the operations of the flowchart are described with reference to a system that performs the operations. This system may include one or more components, such as one or more processors (e.g., CPU(s), GPU(s), and/or TPU(s)). While operations of process 600 are shown in a particular order, this is not meant to be limiting. One or more operations may be reordered, omitted, and/or added.

At block 602, the system selects a training instance including (1) audio data capturing an utterance and (2) a ground truth representation of the utterance. In some implementations, the selected training instance is distinct from training instances used to train a shared encoder and/or a RNN-T decoder portion of the two-pass ASR model. In some other implementations, the selected training instance is additionally utilized to train a shared encoder and/or RNN-T decoder portion of the two-pass ASR model. In some implementations, the training instance can be generated in accordance with process 400 of FIG. 4.

At block 604, the system processes the audio data portion of the training instance using a shared encoder and a LAS decoder to generate predicted LAS output. In many implementations, the shared encoder is previously trained by the system along with the RNN-T decoder, such as the shared encoder trained along with the RNN-T decoder in process 500 of FIG. 5.

At block 606, the system generates a LAS loss based on the ground truth representation of the utterance portion of the training instance and the predicted LAS output.

At block 608, the system updates one or more portions of the LAS decoder based on the LAS loss while not updating the shared encoder. In other words, the previously trained shared encoder is frozen while training the LAS decoder.

At block 610, the system determines whether to perform any additional training. If so, the system proceeds back to block 602, selects an additional training instance, then performs an iteration of blocks 604, 606, and 608 based on the additional training instance, and then performs an additional iteration of block 610. In some implementations, the system can determine to perform more if there are one or more additional unprocessed training instances and/or if other criterion/criteria are not yet satisfied. The other criterion/criteria can include, for example, whether a threshold number of epochs have occurred and/or a threshold duration of training has occurred. Although process 600 is described with respect to a non-batch learning technique, batch learning may additionally and/or alternatively be utilized. If, at block 610, the system determines to not perform additional training, the process ends.

Figure 7:
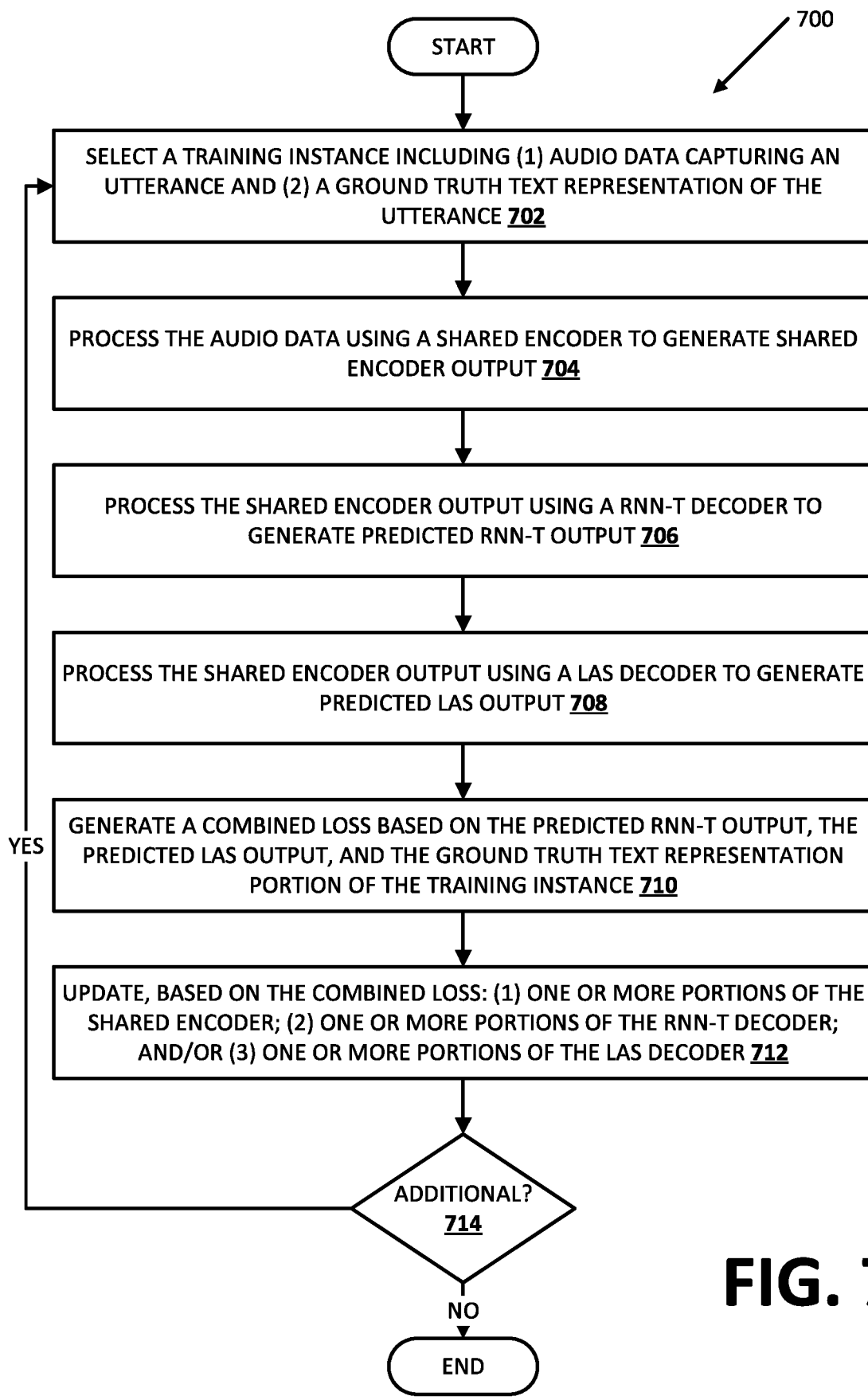
FIG. 7 is a flowchart illustrating an example process of training a two-pass ASR model in accordance with implementations disclosed herein.

FIG. 7 is a flowchart illustrating an example process 700 of jointly training a shared encoder, a RNN-T decoder, and/or a LAS decoder to refine a trained two-pass ASR model in accordance with various implementations. For example, the shared encoder and/or the RNN-T decoder can be trained in accordance with process 500 of FIG. 5 and/or the LAS decoder can be trained in accordance with process 600 of FIG. 6. For convenience, the operations of the flowchart are described with reference to a system that performs the operations. This system may include one or more components, such as one or more processors (e.g., CPU(s), GPU(s), and/or TPU(s)). While operations of process 700 are shown in a particular order, this is not meant to be limiting. One or more operations may be reordered, omitted, and/or added.

At block 702, the system selects a training instance including (1) audio data capturing an utterance and (2) a ground truth text representation of the utterance. In some implementations, the selected training instance is distinct from training instances used to initially train a shared encoder, a RNN-T decoder, and/or a LAS decoder of a two-pass ASR model. In some other implementations, the selected training instance is additionally utilized to initially train a shared encoder, a RNN-T decoder, and/or a LAS decoder of a two-pass ASR model. In some implementations, the training instance can be generated in accordance with process 400 of FIG. 4.

At block 704, the system processes the audio data using an initially trained shared encoder to generate shared encoder output. For example, the shared encoder can be initially trained in accordance with process 500 of FIG. 5.

At block 706, the system processes the shared encoder output using an initially trained RNN-T decoder to generate shared encoder output. For example, the RNN-T decoder can initially be trained in accordance with process 500 of FIG. 5.

At block 708, the system processes the shared encoder output using an initially trained LAS decoder to generate predicted LAS output. For example, the LAS decoder can initially be trained in accordance with process 600 of FIG. 6.

At block 710, the system can generate a combined loss based on the predicted RNN-T output, the predicted LAS output, and the ground truth text representation portion of the training instance. For example, the system can generate a combined loss of $L_{combined(x,y^*)} = \lambda L_{RNNT}(x, y^*) + (1-\lambda) L_{LAS}(x, y^*)$, where x is the instance of audio data, y* is the ground truth text representation portion of the training instance, $L_{RNNT}$ is a RNN-T loss based on the predicted RNN-T output and the ground truth text representation portion of the training instance, and $L_{LAS}$ is a LAS loss based on the predicted LAS output and the ground truth text representation portion of the training instance. Additional and alternative combined losses can be utilized in accordance with many implementations.

At block 712, the system updates, based on the combined loss: (1) one or more portions of the shared encoder; (2) one or more portions of the RNN-T decoder; and/or (3) one or more portions of the LAS decoder.

At block 714, the system determines whether to perform any additional training. If so, the system proceeds back to block 702, selects an additional training instance, then performs an iteration of blocks 704, 706, 708, 710, and 712 based on the additional training instance, and then performs an additional iteration of block 714. In some implementations, the system can determine to perform more training if there are one or more additional unprocessed training instances and/or if other criterion/criteria are not yet satisfied. The other criterion/criteria can include, for example, whether a threshold number of epochs have occurred and/or a threshold duration of training has occurred. Although process 700 is described with respect to a non-batch learning technique, batch learning may additionally and/or alternatively be utilized. If, at block 714, the system determines to not perform additional training, the process ends.

FIG. 8 is a flowchart illustrating a process 800 of generating a text representation of an utterance captured in audio data using a two-pass ASR model, where the two-pass ASR model includes a shared encoder, a RNN-T decoder, and a LAS decoder in accordance with various implementations. For convenience, the operations of the flowchart are described with reference to a system that performs the operations. This system may include one or more components, such as one or more processors (e.g., CPU(s), GPU(s), and/or TPU(s)). While operations of process 800 are shown in a particular order, this is not meant to be limiting. One or more operations may be reordered, omitted, and/or added.

At block 802, the system receives streaming audio data, where the audio data captures an utterance spoken by a human. In many implementations, the audio data is captured using one or more microphones of a client device. For example, the audio data can be captured using microphone(s) of a mobile phone.

At block 804, before the human has finished speaking and in a streaming manner, the system generates one or more candidate text representations of the utterance by processing the audio data using a first-pass portion of a two-pass ASR model. In many implementations, the system processes the audio data using the first-pass portion of the two-pass ASR model by (1) processing the audio data using a shared encoder to generate shared encoder output and (2) processing the shared encoder output using a RNN-T decoder to generate the one or more candidate text representations of the utterance.

At block 806, the system determines the human has finished speaking. In some implementations, the system can determine the human has finished speaking based on an end of query token generated using the RNN-T decoder. In some implementations, the system can determine the human has finished speaking based on an end of query token generated by processing the audio data using an endpointer model (not depicted).

At block 808, in response to determining the human has finished speaking, the system generates a text representation of the utterance using a second-pass portion of the two-pass ASR model by processing (1) the shared encoder output along with (2) the one or more candidate text representations of the utterance using a LAS decoder to generate the text representation of the utterance. In some implementations, the LAS decoder can be used to rescore the top-K hypotheses generated using the RNN-T decoder (i.e., the top-K candidate text representations generated using the RNN-T decoder). For example, the LAS decoder can be used to rescore the top three hypotheses, the top five hypotheses, the top twenty hypotheses, and/or an additional number of top hypotheses generated using the RNN-T decoder. For example, for each of the top hypotheses, the LAS decoder can be run in a teacher-forcing mode with attention on the shared encoder output, to generate a LAS score combining a probability of the candidate hypothesis and an attention parameter(s). The system can select the hypothesis with the highest LAS score as the text representation of the utterance. Additionally or alternatively, the LAS decoder can be used to rescore a tree-based lattice the top candidate text representations of the utterance represented as a lattice. For example, the LAS decoder can be used to process each lattice arc in the teacher-forcing mode with attention of the shared encoder output, to update the probability in the arc. The system can identify the text representation of the utterance as the candidate text representation with the highest probability after the probabilities are updated using the LAS decoder.

At block 810, the system performs one or more actions based on the text representation of the utterance. For example, the system can render output based on the text representation on a screen of the client device for the speaker. In some implementations, the system can render output based on one or more of the candidate text representations, such as rendering output based on the candidate text representation with the highest probability, while the human is speaking the utterance. In some such implementations, the system can render output based on the text representation by revising the output rendered while the human was speaking the utterance. Additionally or alternatively, the system can render one or more responses to the text representation of the utterance. For example, the system can render the response of "it is 75 degrees and sunny" in response to the human speaking the utterance of "what is the weather today". Additionally or alternatively, the system can control one or more client devices based on the text representation of the utterance. For example, the system can change the temperature on a networked smart thermostat to 72 degrees in response to the utterance of "set the temperature of my thermostat to 72 degrees". In a variety of implementations, the system can perform additional and/or alternative actions based on the text representation of the utterance.

Figure 9:
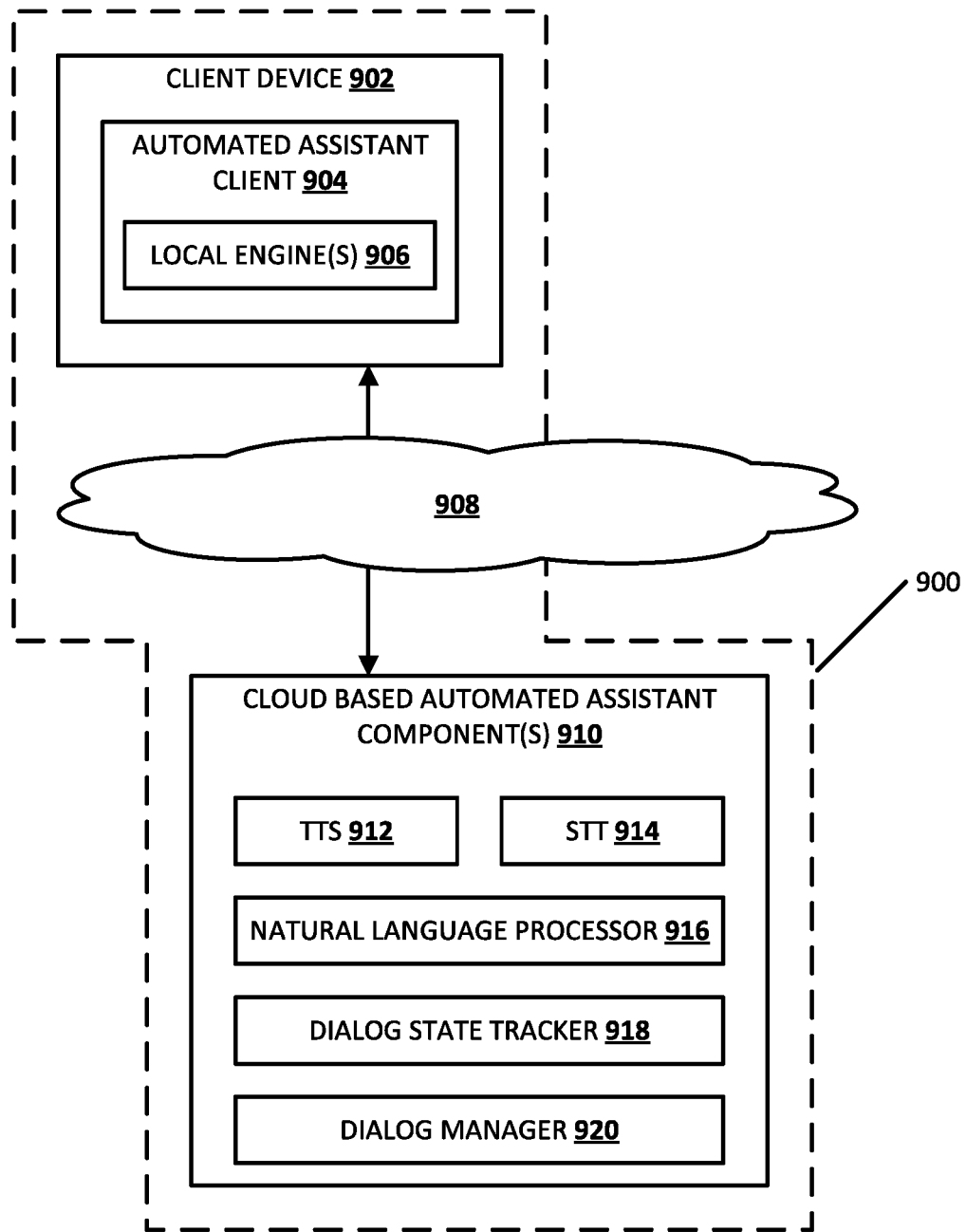
FIG. 9 illustrates a block diagram of another example environment in which implementations disclosed herein may be implemented.

Turning now to FIG. 9, an example environment is illustrated where various implementations can be performed. FIG. 9 is described initially, and includes a client computing device 902, which executes an instance of an automated assistant client 904. One or more cloud-based automated assistant components 910 can be implemented on one or more computing systems (collectively referred to as a "cloud" computing system) that are communicatively coupled to client device 902 via one or more local and/or wide area networks (e.g., the Internet) indicated generally at 908.

An instance of an automated assistant client 904, by way of its interactions with one or more cloud-based automated assistant components 910, may form what appears to be, from the user's perspective, a logical instance of an automated assistant 900 with which the user may engage in a human-to-computer dialog. An instance of such an automated assistant 900 is depicted in FIG. 9. It thus should be understood that in some implementations, a user that engages with an automated assistant client 904 executing on client device 902 may, in effect, engage with his or her own logical instance of an automated assistant 900. For the sakes of brevity and simplicity, the term "automated assistant" as used herein as "serving" a particular user will often refer to the combination of an automated assistant client 904 executing on a client device 902 operated by the user and one or more cloud-based automated assistant components 910 (which may be shared amongst multiple automated assistant clients of multiple client computing devices). It should also be understood that in some implementations, automated assistant 900 may respond to a request from any user regardless of whether the user is actually "served" by that particular instance of automated assistant 900.

The client computing device 902 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 902 may optionally operate one or more other applications that are in addition to automated assistant client 904, such as a message exchange client (e.g., SMS, MMS, online chat), a browser, and so forth. In some of those various implementations, one or more of the other applications can optionally interface (e.g., via an application programming interface) with the automated assistant 900, or include their own instance of an automated assistant application (that may also interface with the cloud-based automated assistant component(s) 910).

Automated assistant 900 engages in human-to-computer dialog sessions with a user via user interface input and output devices of the client device 902. To preserve user privacy and/or to conserve resources, in many situations a user must often explicitly invoke the automated assistant 900 before the automated assistant will fully process a spoken utterance. The explicit invocation of the automated assistant 900 can occur in response to certain user interface input received at the client device 902. For example, user interface inputs that can invoke the automated assistant 900 via the client device 902 can optionally include actuations of a hardware and/or virtual button of the client device 902. Moreover, the automated assistant client can include one or more local engines 906, such as an invocation engine that is operable to detect the presence of one or more spoken invocation phrases. The invocation engine can invoke the automated assistant 900 in response to detection of one of the spoken invocation phrases. For example, the invocation engine can invoke the automated assistant 900 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 602, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 900. As used herein, "invoking" the automated assistant 900 can include causing one or more previously inactive functions of the automated assistant 900 to be activated. For example, invoking the automated assistant 900 can include causing one or more local engines 906 and/or cloud-based automated assistant components 910 to further process audio data frames based on which the invocation phrase was detected, and/or one or more following audio data frames (whereas prior to invoking no further processing of audio data frames was occurring). For instance, local and/or cloud-based components can process captured audio data using a two-pass ASR model in response to invocation of the automated assistant 900.

The one or more local engine(s) 906 of automated assistant 900 are optional, and can include, for example, the invocation engine described above, a local voice-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 902 is relatively constrained in terms of computing resources (e.g., processor cycles, memory, battery, etc.), the local engines 906 may have limited functionality relative to any counterparts that are included in cloud-based automated assistant components 910.

Cloud-based automated assistant components 910 leverage the virtually limitless resources of the cloud to perform more robust and/or more accurate processing of audio data, and/or other user interface input, relative to any counterparts of the local engine(s) 906. Again, in various implementations, the client device 902 can provide audio data and/or other data to the cloud-based automated assistant components 910 in response to the invocation engine detecting a spoken invocation phrase, or detecting some other explicit invocation of the automated assistant 900.

The illustrated cloud-based automated assistant components 910 include a cloud-based TTS module 912, a cloud-based STT module 914, a natural language processor 916, a dialog state tracker 918, and a dialog manager 920. In some implementations, one or more of the engines and/or modules of automated assistant 900 may be omitted, combined, and/or implemented in a component that is separate from automated assistant 900. Further, in some implementations automated assistant 900 can include additional and/or alternative engines and/or modules. Cloud-based STT module 914 can convert audio data into text, which may then be provided to natural language processor 916.

Cloud-based TTS module 912 can convert textual data (e.g., natural language responses formulated by automated assistant 900) into computer-generated speech output. In some implementations, TTS module 912 may provide the computer-generated speech output to client device 902 to be output directly, e.g., using one or more speakers. In other implementations, textual data (e.g., natural language responses) generated by automated assistant 900 may be provided to one of the local engine(s) 906, which may then convert the textual data into computer-generated speech that is output locally.

Natural language processor 916 of automated assistant 900 processes free form natural language input and generates, based on the natural language input, annotated output for use by one or more other components of the automated assistant 900. For example, the natural language processor 916 can process natural language free-form input that is textual input that is a conversion, by STT module 914, of audio data provided by a user via client device 902. The generated annotated output may include one or more annotations of the natural language input and optionally one or more (e.g., all) of the terms of the natural language input.

In some implementations, the natural language processor 916 is configured to identify and annotate various types of grammatical information in natural language input. In some implementations, the natural language processor 916 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 916 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there." In some implementations, one or more components of the natural language processor 916 may rely on annotations from one or more other components of the natural language processor 916. In some implementations, in processing a particular natural language input, one or more components of the natural language processor 916 may use related prior input and/or other related data outside of the particular natural language input to determine one or more annotations.

In some implementations, dialog state tracker 918 may be configured to keep track of a "dialog state" that includes, for instance, a belief state of a one or more users' goals (or "intents") over the course of a human-to-computer dialog session and/or across multiple dialog sessions. In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 920 may be configured to map a current dialog state, e.g., provided by dialog state tracker 918, to one or more "responsive actions" of a plurality of candidate responsive actions that are then performed by automated assistant 900. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 900 outputting additional natural language dialog. This responsive dialog may include, for instance, requests that the user provide parameters for some action (i.e., fill slots) that dialog state tracker 918 believes the user intends to perform. In some implementations, responsive actions may include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), a command to a peripheral device (e.g., to turn off a light bulb), and so forth.

Figure 10:
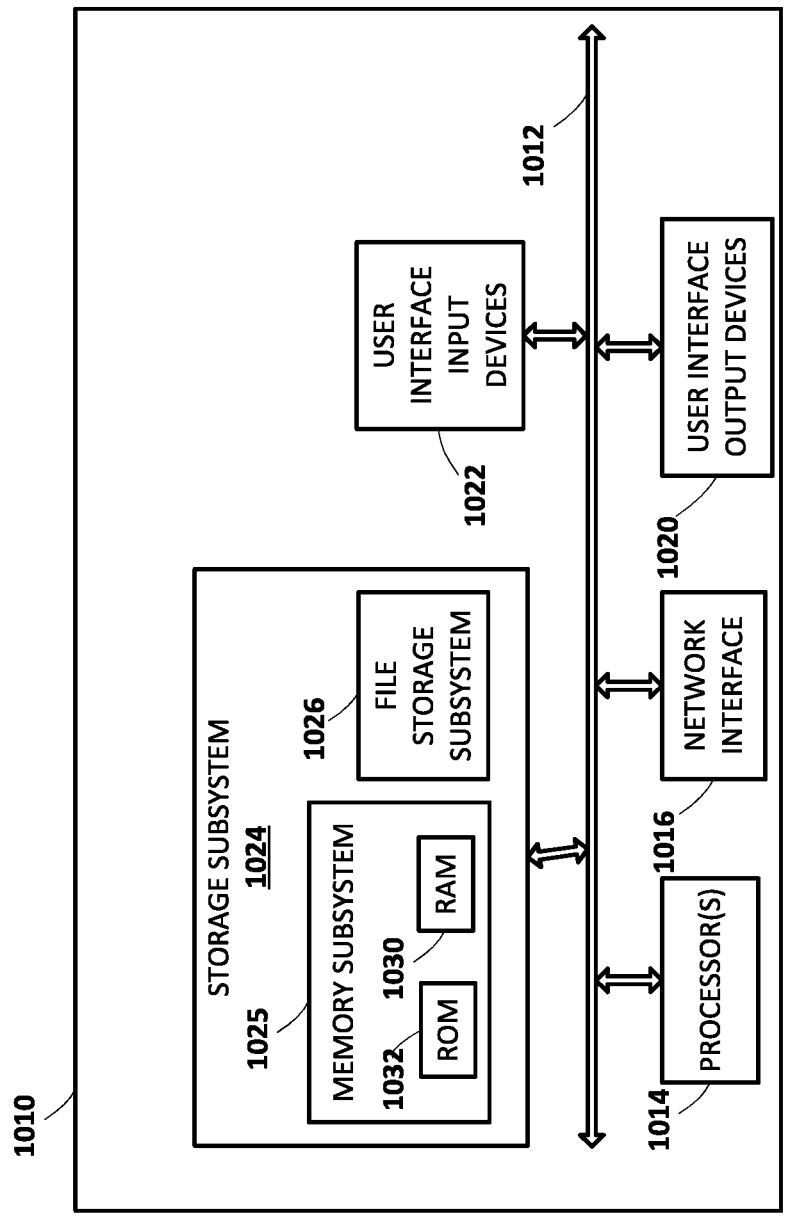
FIG. 10 illustrates an example architecture of a computing device.

FIG. 10 is a block diagram of an example computing device 1010 that may optionally be utilized to perform one or more aspects of techniques described herein. In some implementations, one or more of a client computing device, and/or other component(s) may comprise one or more components of the example computing device 1010.

Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of one or more of the processes of FIG. 4, FIG. 5, FIG. 6, FIG. 7, and/or FIG. 8 as well as to implement various components depicted in FIG. 3 and/or FIG. 9.

These software modules are generally executed by processor 1014 alone or in combination with other processors. Memory 1025 used in the storage subsystem 1024 can include a number of memories including a main random access memory ("RAM") 1030 for storage of instructions and data during program execution and a read only memory ("ROM") 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by processor(s) is provided and includes receiving audio data that includes a sequence of segments and that captures an utterance spoken by a human speaker. The method further includes, for each of the segments, and in the sequence: processing the segment using a first-pass portion of an automatic speech recognition ("ASR") model to generate recurrent neural network transformer ("RNN-T") output. Processing each of the segments using the first-pass portion of the ASR model includes: processing the segment using a shared encoder portion to generate shared encoder output; adding the shared encoder output as the next item in a shared encoder buffer; and processing the shared encoder output using a RNN-T decoder portion to generate a corresponding portion of RNN-T output. The method further includes determining one or more first-pass candidate text representations of the utterance based on the RNN-T output, and determining the human speaker has finished speaking the utterance. The method further includes, in response to determining the human speaker has finished speaking the utterance, generating listen attention spell ("LAS") output based on processing, using a second-pass LAS decoder portion of the ASR model, the shared encoder output from the shared encoder buffer along with the (a) the RNN-T output and/or (b) the one or more first-pass candidate text representations of the utterance. The method further includes generating a final text representation of the utterance based on the LAS output.

These and other implementations of the technology can include one or more of the following features.

In some implementations, the method further includes: rendering output, in a streaming manner, based on at least one of the one or more first-pass candidate text representations of the utterance; and updating the rendered output based on the final text representation of the utterance.

In some implementations, the method further includes controlling one or more devices based on the final text representation of the utterance.

In some implementations, the method further includes determining content responsive to the final text representation, and rendering output based on the determined content.

In some implementations, a method implemented by processor(s) is provided and includes: receiving an utterance; processing the utterance using a multi-pass decoder that includes a first-pass, recurrent neural network transducer (RNN-T), end-to-end (E2E) decoder and a second-pass, Listen, Attend and Spell (LAS) decoder; and outputting a final result of processing the utterance using the multi-pass decoder.

These and other implementations of the technology can include one or more of the following features.

In some implementations, processing the utterance using the multi-pass decoder includes: transmitting frames of audio data that represents the utterance to the RNN-T, E2E decoder for processing; before the result of processing the utterance is finalized, providing, for output, one or more streaming results of processing the transmitted frames of audio data using the RNN-T, E2E decoder; after the RNN-T, E2E decoder completes processing the transmitted frames, transmitting the frames of the audio data that represents the utterance to the LAS decoder for processing; and finalizing the result of processing the utterance based on a result of processing the transmitted frames of audio data using the LAS decoder. In some of those implementations, the method further includes transmitting one or more of the streaming results of processing the transmitted frames of audio data using the RNN-T, E2E decoder to the LAS decoder. The result of processing the utterance can be finalized further based on a result of processing the one or more streaming results using the LAS decoder. In some of those implementations, finalizing the result of processing the utterance includes selecting, using the LAS decoder, a particular streaming result selected from among the one or more streaming results that are transmitted from the RNN-T, E2E decoder to the LAS decoder.

In some implementations, the utterance is processed by the LAS decoder while the LAS decoder is in a second beam search mode.

In some implementations, the utterance is processed by the LAS decoder while the LAS decoder is in a rescoring mode.

In some implementations, the multi-pass decoder further includes a single encoder that is shared with both the LAS decoder and the RNN-T, E2E decoder.

In some implementations, the multi-pass decoder is trained to optimize minimum word error rate (MWER).

In some implementations, the multi-pass decoder is trained using a multi-step approach that involves independently training the RNN-T, E2E decoder, then ceasing training the RNN-T, E2E decoder, then independently training the LAS decoder.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method comprising:
receiving an utterance;
processing the utterance using a multi-pass decoder that includes a first-pass, recurrent neural network transducer (RNN-T), end-to-end (E2E) decoder and a second-pass, Listen, Attend and Spell (LAS) decoder, wherein processing the utterance using the multi-pass decoder comprises:
transmitting frames of audio data that represents the utterance to the RNN-T, E2E decoder for processing;
before the result of processing the utterance is finalized, providing, for output, one or more streaming results of processing the transmitted frames of audio data using the RNN-T, E2E decoder;
after the RNN-T, E2E decoder completes processing the transmitted frames, transmitting the frames of the audio data that represents the utterance to the LAS decoder for processing; and
finalizing a final result of processing the utterance based on a result of processing the transmitted frames of audio data using the LAS decoder; and
outputting the final result of processing the utterance using the multi-pass decoder.

2. The method of claim 1, comprising:
transmitting one or more of the streaming results of processing the transmitted frames of audio data using the RNN-T, E2E decoder to the LAS decoder,
wherein the result of processing the utterance is finalized further based on a result
of processing the one or more streaming results using the LAS decoder.

3. The method of claim 2, wherein finalizing the result of processing the utterance comprises selecting, by the LAS decoder, a particular streaming result selected from among the one or more streaming results that are transmitted from the RNN-T, E2E decoder to the LAS decoder.

4. The method of claim 1, wherein the utterance is processed by the LAS decoder while the LAS decoder is in a second beam search mode.

5. The method of claim 1, wherein the utterance is processed by the LAS decoder while the LAS decoder is in a rescoring mode.

6. The method of claim 1, wherein the multi-pass decoder further comprises a single encoder that is shared with both the LAS decoder and the RNN-T, E2E decoder.

7. The method of claim 1, wherein the multi-pass decoder is trained to optimize minimum word error rate (MWER).

8. The method of claim 1, wherein the multi-pass decoder is trained using a multi-step approach that involves independently training the RNN-T, E2E decoder, then ceasing training the RNN-T, E2E decoder, then independently training the LAS decoder.

9. A method implemented by one or more processors, the method comprising:
receiving audio data comprising a sequence of segments and capturing an utterance spoken by a human speaker;
for each segment in the sequence of segments, and in the sequence:
processing the segment using a first-pass portion of an automatic speech recognition ("ASR") model to generate recurrent neural network transformer ("RNN-T") output, wherein processing the segment using the first-pass portion of the ASR model comprises:
processing the segment using a shared encoder portion to generate shared encoder output,
adding the shared encoder output as the next item in a shared encoder buffer, and
processing the shared encoder output using a RNN-T decoder portion to generate a corresponding portion of RNN-T output;
determining one or more first-pass candidate text representations of the utterance based on the RNN-T output;
determining the human speaker has finished speaking the utterance;
in response to determining the human speaker has finished speaking the utterance, generating listen attention spell ("LAS") output based on processing, using a second-pass LAS decoder portion of the ASR model, the shared encoder output from the shared encoder buffer along with at least one of (a) the RNN-T output or (b) the one or more first-pass candidate text representations of the utterance; and
generating a final text representation of the utterance based on the LAS output.

10. The method of claim 9, further comprising:
rendering output, in a streaming manner, based on at least one of the one or more first-pass candidate text representations of the utterance; and updating the rendered output based on the final text representation of the utterance.

11. The method of claim 9, further comprising:
controlling one or more devices based on the final text representation of the utterance.

12. The method of claim 9, further comprising:
determining content responsive to the final text representation; and
rendering output based on the determined content.

13. A client device comprising:
memory storing instructions;
one or more processors that execute the instructions, stored in the memory, to:
receive an utterance;
process the utterance using a multi-pass decoder that includes a first-pass, recurrent neural network transducer (RNN-T), end-to-end (E2E) decoder and a second-pass, Listen, Attend and Spell (LAS) decoder, wherein the instructions for processing the utterance using the multi-pass decoder include instructions to:
transmit frames of audio data that represents the utterance to the RNN-T, E2E decoder for processing;
before the result of processing the utterance is finalized, provide, for output, one or more streaming results of processing the transmitted frames of audio data using the RNN-T, E2E decoder;
after the RNN-T, E2E decoder completes processing the transmitted frames, transmit the frames of the audio data that represents the utterance to the LAS decoder for processing; and
finalize a final result of processing the utterance based on a result of processing the transmitted frames of audio data using the LAS decoder; and
output the final result of processing the utterance using the multi-pass decoder.

14. The client device of claim 13, wherein the instructions further include:
transmit one or more of the streaming results of processing the transmitted frames of audio data using the RNN-T, E2E decoder to the LAS decoder,
wherein the result of processing the utterance is finalized further based on a result of processing the one or more streaming results using the LAS decoder.

15. The client device of claim 14, wherein the instructions for finalizing the result of processing the utterance comprises selecting, by the LAS decoder, a particular streaming result selected from among the one or more streaming results that are transmitted from the RNN-T, E2E decoder to the LAS decoder.

16. The client device of claim 13, wherein the utterance is processed by the LAS decoder while the LAS decoder is in a second beam search mode.

17. The client device of claim 13, wherein the utterance is processed by the LAS decoder while the LAS decoder is in a rescoring mode.

18. The client device of claim 13, wherein the multi-pass decoder further comprises a single encoder that is shared with both the LAS decoder and the RNN-T, E2E decoder.

* * * * *